United States Patent
Dinardo et al.

(10) Patent No.: US 10,230,845 B2
(45) Date of Patent: *Mar. 12, 2019

(54) CUSTOMIZED COMMUNICATION ROUTING

(71) Applicant: AT&T Mobility II LLC, Atlanta, GA (US)

(72) Inventors: Christopher Dinardo, Redmond, WA (US); Axel Wells, Duvall, WA (US); Thomas Norman, Edmonds, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,376

(22) Filed: Mar. 12, 2018

(65) Prior Publication Data

US 2018/0205826 A1    Jul. 19, 2018

Related U.S. Application Data

(63) Continuation of application No. 14/976,748, filed on Dec. 21, 2015, now Pat. No. 9,948,780.

(51) Int. Cl.
*H04M 3/00* (2006.01)
*H04M 3/51* (2006.01)
*H04L 29/08* (2006.01)
*H04M 3/523* (2006.01)

(52) U.S. Cl.
CPC .......... *H04M 3/5191* (2013.01); *H04L 67/02* (2013.01); *H04L 67/22* (2013.01); *H04L 67/306* (2013.01); *H04M 3/5233* (2013.01)

(58) Field of Classification Search
CPC .......................... H04M 3/5191; H04M 3/5233
USPC ....... 379/265.01–265.14, 266.01–266.1, 309
See application file for complete search history.

(56) References Cited

U.S. PATENT DOCUMENTS

| | | | |
|---|---|---|---|
| 9,325,846 B1 * | 4/2016 | Dixon | ................. H04M 3/5166 |
| 9,401,962 B2 | 7/2016 | Parker | |
| 2009/0254856 A1 | 10/2009 | Cwajbaum | |
| 2010/0011123 A1 | 1/2010 | Dantzig et al. | |
| 2010/0251098 A1 | 9/2010 | Rekhi et al. | |
| 2010/0293448 A1 | 11/2010 | Rand et al. | |
| 2011/0022945 A1 | 1/2011 | Yang | |
| 2011/0072154 A1 | 3/2011 | Bogdanovic | |
| 2011/0235517 A1 | 9/2011 | Terpstra | |

(Continued)

FOREIGN PATENT DOCUMENTS

CN  102769641   11/2012

*Primary Examiner* — William Deane, Jr.
(74) *Attorney, Agent, or Firm* — Greenblum & Bernstein, P.L.C.

(57) ABSTRACT

Devices, systems, and methods for customized communication routing based on user information. When a presence of a first user is detected on a pre-designated webpage of a plurality of webpages of a website, attribute information of the first user is obtained in response to the detected presence and the pre-designated webpage is dynamically modified to display a communication routing option based on the attribute information of the first user. The communication routing option displayed to the first user is different from a communication routing option displayed to a second user having different attribute information. The routing option available to the second user is hidden from display to the first user.

20 Claims, 7 Drawing Sheets

(56) References Cited

U.S. PATENT DOCUMENTS

| | | |
|---|---|---|
| 2011/0320277 A1 | 12/2011 | Isaacs |
| 2012/0226995 A1 | 9/2012 | Kimchi et al. |
| 2012/0303599 A1 | 11/2012 | Patil |
| 2014/0012669 A1 | 1/2014 | Heiser, II et al. |
| 2014/0201618 A1 | 7/2014 | Hansmann et al. |
| 2014/0244480 A1* | 8/2014 | Kanjlia .......... G06Q 20/22 705/38 |
| 2014/0325378 A1 | 10/2014 | Chen |
| 2015/0081470 A1 | 3/2015 | Westphal |
| 2016/0042419 A1 | 2/2016 | Singh |
| 2017/0013073 A1* | 1/2017 | Mendez .......... H04L 67/22 |
| 2017/0200211 A1 | 7/2017 | Liu |

* cited by examiner

Computer

CUSTOMIZED COMMUNICATION ROUTING

CROSS-REFERENCE TO RELATED APPLICATION(S)

This application is a Continuation of U.S. patent application Ser. No. 14/976,748, filed on Dec. 21, 2015, the entire disclosure of which is incorporated by reference herein.

BACKGROUND

1. Field of the Disclosure

The present disclosure relates to the field of communications. More particularly, the present disclosure relates to customized communication routing based on user information.

2. Background Information

Consumers may subscribe to various levels of services and/or goods from a service provider. These consumers may also utilize various levels of support services in connection with the subscribed services and/or goods. The service provider, however, typically has limited resources to provide the support services, which are often offered via a common communication channel.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
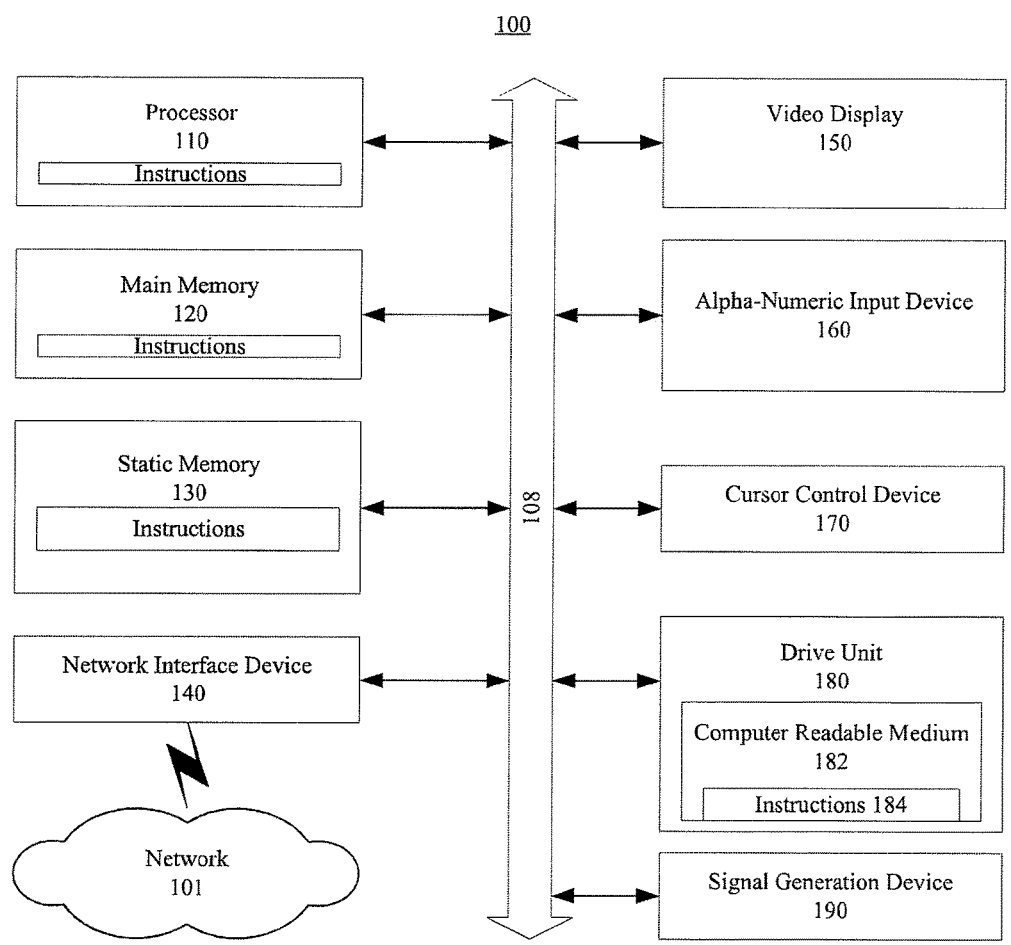
FIG. 1 shows an exemplary general computer system that includes a set of instructions for customized communication routing.

FIG. 1 is an illustrative embodiment of a general computer system, on which a method for customized communication routing can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
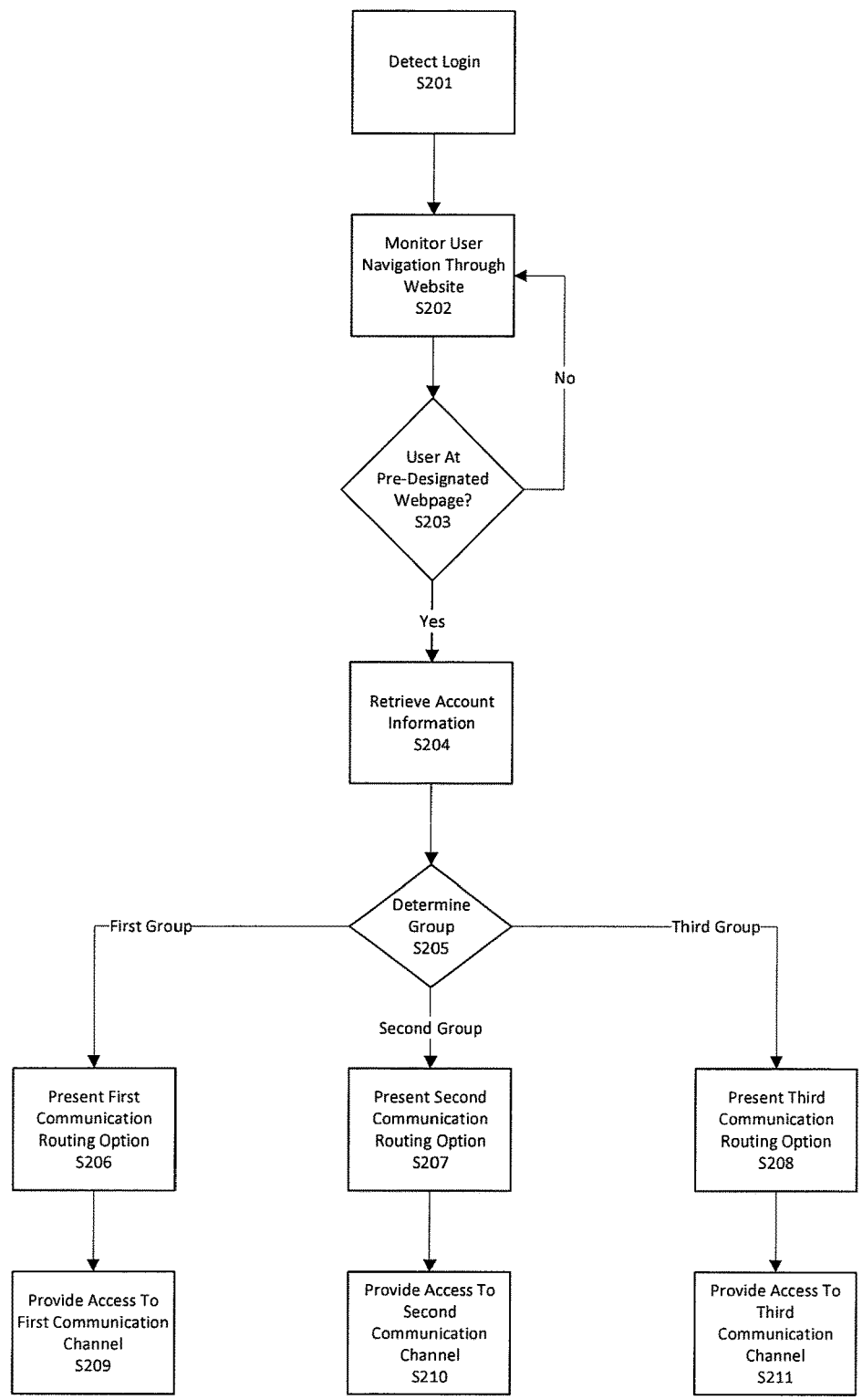
FIG. 2 shows an exemplary method for customized communication routing, according to an aspect of the present disclosure.

FIG. 2 shows an exemplary method for customized communication routing, according to an aspect of the present disclosure.

At S201, a user login at a website of a service provider is detected. A user may log in to the website by entering identifying information, which may include, for example, a user name, identification number, email address, alias, and the like. The user may also provide corresponding authentication information, which may include, for example, a preregistered password, a security code, biometric data (e.g., a finger print, a retina scan, voice recognition, etc.) and the like. The service provider may be an organization or a business, which may provide various levels of services or products (e.g., premium to budget) to various individuals for consumption. For example, the service provider may be a communication service provider (e.g., cable, internet, telephone, etc.). The website of the service provider may include multiple webpages that are linked together and which may be navigated via a web browser operation.

At S202, a user's navigation through the website including multiple webpages is monitored. The user's navigation on the website may be monitored continuously, at predetermined intervals, or when a navigation input is provided on the web browser or the website.

At S203, a determination of whether the user has navigated to a designated webpage among the multiple webpages is determined. In an example, the user's presence at the pre-designated webpage may be detected in response to a navigation operation via the web browser (e.g., user clicking on a link to the pre-designated webpage). The user's presence at the pre-designated webpage may be detected immediately after the navigation operation or after passing a predetermined threshold of time. For example, if the user navigates to a cancellation webpage but then shortly thereafter (e.g., in less than a predetermined 5 second threshold) navigates to a technical support page, a server hosting the website may determine that the user's navigation to the cancellation webpage was performed erroneously. The server's determination may reflect an understanding that such brief user navigations to the pre-designated webpage are accidental, unintentional, will not result in a cancellation, and so on. If it is determined that the user is not present (e.g., for more than a threshold time) at the pre-designated webpage at S203, the server continues to monitor the user's navigation operation at the website at S202. If it is determined that the user is present at the pre-designated webpage at S203, account information of the user is retrieved at S204.

In an example, the account information of the user may be retrieved based on login information provided by the user, which may be provided by the user when entering the website or upon arriving at the pre-designated webpage. In another example, the account information of the user may be retrieved automatically when the website recognizes that a device (e.g., smart phone) used to enter the website has been registered with the service provider or the website.

Account information of the user may include various aspects of the user's history with the website. For example, account information may include a user's tenure with the service provider represented by the website, service history (e.g., current service plan, previous service plans), payment history, promotion history (e.g., promotions previously applied), membership history (e.g., prior cancellation requests, complaints, etc.) and/or support history (e.g., previous contacts with support center including dates, reason (s), and resolution). Further, the account information may also indicate a segment or a group to which a user may be assigned based on one or more items included in the account information. A group to which the user may be assigned may be determined in real-time or at predetermined intervals.

At S205, a determination of group assignment for the user is made. If the user is determined to be within a first group, then the user may be presented with a first communication routing option at the pre-designated webpage for providing access to a first communication channel at S209. More specifically, the user may be provided with a contact number, a virtual button, a link, and the like, to provide access to the first communication channel. The first group may, for example, include a group of users that may contribute resources above a first predetermined threshold. The first communication channel may include, domestic call centers, call centers with shorter wait times, call centers with more experienced or highly rated/trained customer service agents, and the like.

The amount of resource contribution may be a gross amount, which may not account for resource expenditures by the service provider for supporting the respective users, or a net amount, which may account for the resource expenditures with respect to the resource contribution. In an example, the resource contribution of the user may be based on a number of products or services purchased or consumed by the user, and the resource expenditure by the service provider may be based on amount of time and/or money expended by the service provider to service or support its users.

If the user is determined within a second group, then the user may be presented with a second communication routing option at the pre-designated webpage for providing access to a second communication channel at S210. The second group may, for example, include a group of users that may contribute resources below the first predetermined threshold but above a second predetermined threshold. The second communication channel may include off-shore call centers, call centers with longer wait times, call centers with less experienced customer service agents, and the like.

If the user is determined with a third group, then the user may be presented with a third communication routing option at the pre-designated webpage for providing access to a third communication channel at S211. The third group may, for example, include a group of users that may contribute resources below the second predetermined threshold. The third communication channel may include an automated self-servicing system, call centers with customer service agent trainees, a call center that dictates a call schedule with the user (i.e., user is required to leave a number and wait for a call back), and the like.

Figure 3:
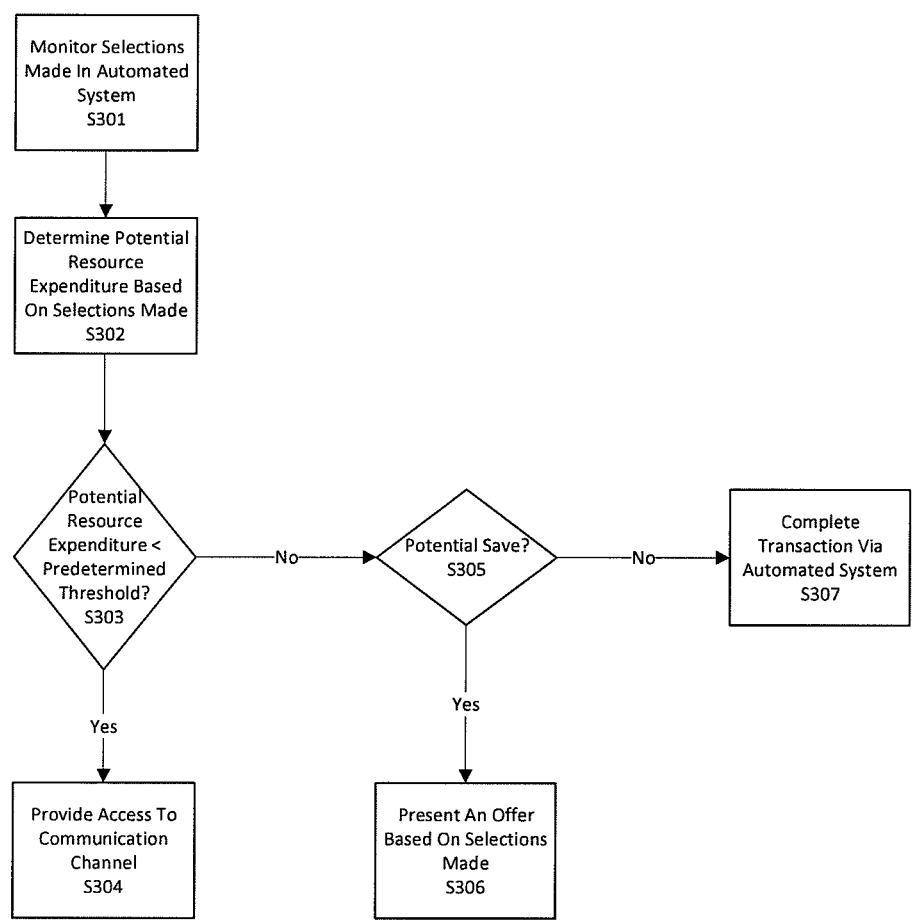
FIG. 3 shows an exemplary method for providing support through an automated system, according to an aspect of the present disclosure.

FIG. 3 shows an exemplary method for providing support through an automated system, according to an aspect of the present disclosure.

At S301, a user's selections in the automated system are monitored. In an example, the automated system may include a web-based service system, an interactive voice response (IVR) system, a touch-tone system, or the like.

At S302, a server may determine a potential resource expenditure that may be required to resolve an issue for the user based on selections made by the user. For example, the potential resource expenditure may be an estimated length of time of estimated cost that is typically expended by a customer service agent to resolve the issue indicated by the user.

At S303, a determination of whether the potential resource expenditure would be higher than a predetermined threshold (e.g., 10 minutes) is made. However, aspects of the disclosure are not limited thereto, such that the potential resource expenditure may be determined with respect to the resource contribution, actual or potential, of the user. For example, if the issue the user seeks to inquire about is upgrading of service or adding of additional service, the server may determine that potential resource contribution of the user may be sufficient to route the user out of the automated self-servicing system to a communication channel with a customer service agent at S304. More specifically, the server may determine that if the net potential resource expenditure (e.g., potential resource expenditure—potential resource contribution) is less than the predetermined threshold, the user should be routed out of the automated self-servicing system to the communication channel with a customer service agent.

However, if it is determined that the potential resource expenditure for resolving the user's issue would be higher than the predetermined threshold, then at S305, a further determination of whether an attempt should be made to save the user from service termination is made. If it is determined that an attempt should be made to save the user from service termination, then the server may present an offer based on the selections made in the automated system at S306. However, aspects of the disclosure are not limited thereto, such that the offer may be additionally or independently based on account history (e.g., previous offers inquired by the user, previous complaints, etc.), offers available at the time of the interaction with the automated system, and the like.

Alternatively, if it is determined that an attempt should not be made to save the user from service termination at S305, the user is directed to complete his or her transaction via the automated system at S307.

Figure 4:
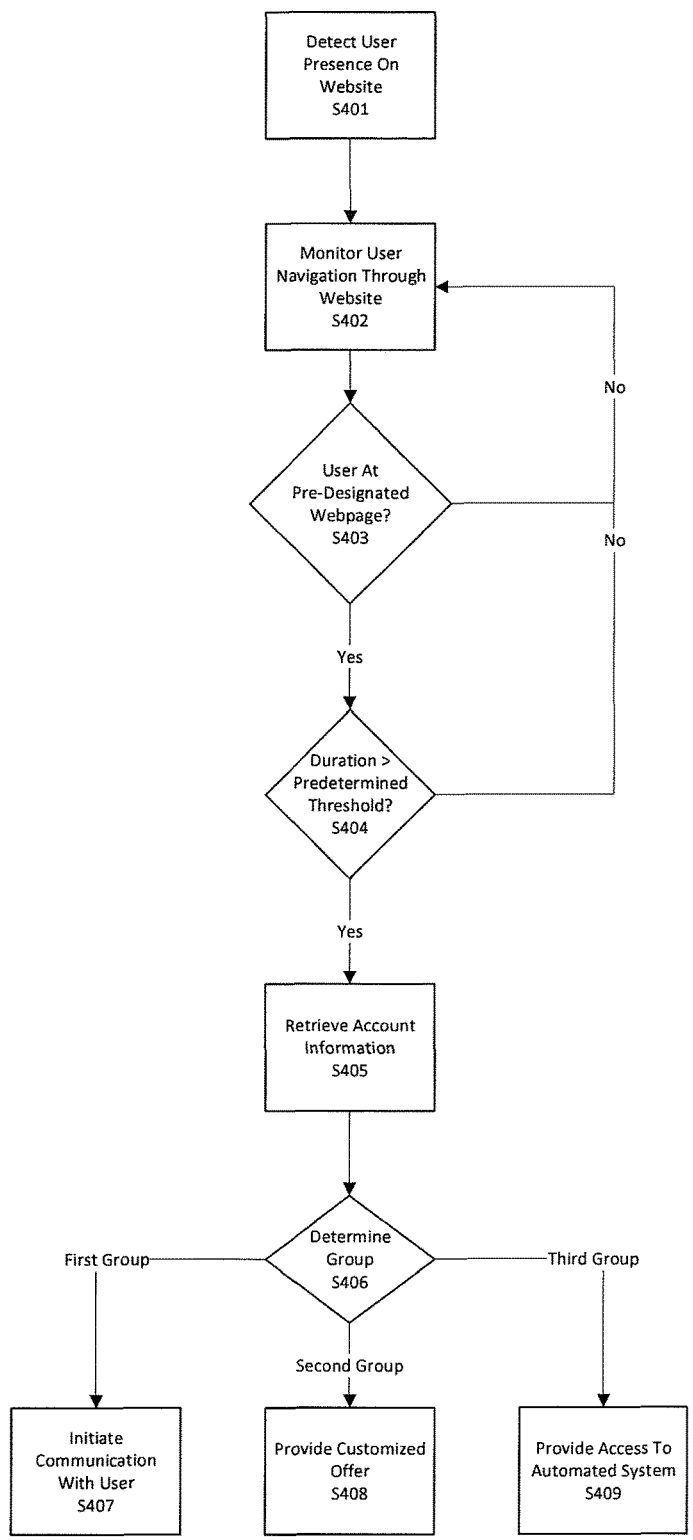
FIG. 4 shows an exemplary method for customized communication routing, according to an aspect of the present disclosure.

FIG. 4 shows an exemplary method for customized communication routing, according to an aspect of the present disclosure.

At S401, a user's presence on a website of a service provider is detected. The website of the service provider may include multiple webpages that are linked together and which may be navigated via a web browser operation.

At S402, user's navigation through the website including multiple webpages is monitored. The user's navigation on the website may be monitored continuously, at predetermined intervals, or when a navigation input is provided on the web browser or the website. However, aspects of the present disclosure are not limited thereto, such that user's actions on the website may be monitored after the user navigates to a pre-designated webpage in the website of the service provider.

At S403, a determination of whether the user has navigated to a designated webpage among the multiple webpages is determined. In an example, the user's presence at the pre-designated webpage may be detected in response to a navigation operation via the web browser (e.g., user clicking on a link to the pre-designated webpage). If it is determined that the user is not present at the pre-designated webpage at S403, the server continues to monitor the user's navigation operation at the website at S402. If it is determined that the user is present at the pre-designed webpage at S403, a determination of whether the user stays at the pre-designated webpage longer than a predetermined threshold (e.g., 5 seconds) is made at S404.

If it is determined that the user stays at the pre-designated webpage less than then predetermined threshold at S404, user's navigation operation is continued to be monitored at S402. For example, if the user navigates to the pre-designated webpage and then navigates to another webpage before reaching the predetermined threshold, the server may determine that the user's navigation to the pre-designated webpage was unintended. More specifically, if the user navigates to a cancellation webpage then shortly thereafter (e.g., less than 5 seconds) navigates to a technical support page, the server hosting the website may determine that the user's navigation to the cancellation webpage was performed erroneously and determine that the user was not at the pre-designated webpage in order to cancel.

If it is determined that the user stayed longer than the predetermined threshold, account information of the user is retrieved at S405.

In an example, the account information of the user may be retrieved based on login information provided by the user, which may be provided by the user when entering the website or upon arriving at the pre-designated webpage. More specifically, if the login information of the user was previously provided before arriving at the pre-designated webpage, the account information of the user may be retrieved automatically at S405. Alternatively, if the login information of the user was not previously provided before navigating to the pre-designated webpage, a request for login information may be made before retrieving account information of the user. In another example, the account information of the user may be retrieved automatically when the website recognizes that a device (e.g., smart phone) used to enter the website has been registered with the service provider or the website.

Account information of the user may include various aspects of the user's history with the website. For example, account information may include a user's resource contribution history and/or the service user's resource expenditure history for the user. Further, the user's history may also indicate changes in user's behavior, which may include recent change in service levels or resource contributions. Further, the account information may also indicate a segment or a group to which a user may be assigned based on one or more items included in the account information. A group assignment for the user may be determined in real-time or at predetermined intervals.

At S406, a determination of group assignment for the user is made. For example, the group assignment may indicated in the account information, or the group assignment may be determined dynamically based on the user account information, such as the user's resource contribution history. If the user is determined to be within a first group, then a customer agent initiates a communication with the user at S407. In an example, a chat message from a customer service agent may appear within the pre-designated webpage, or the user may receive a call/text message from the customer service agent. However, aspects of the disclosure are note limited thereto, such that a virtual icon may be triggered for the user to select to initiate communication with the customer agent. For example, a virtual button indicating that a customer service agent is available to chat may appear at the pre-designated webpage, or a virtual button indicating that the user may receive a call/text from the customer service agent may appear at the pre-designated webpage.

If the user is determined to be within a second group, then a customized offer is directed to the user at S408. For example, if the account information of the user indicates that the user recently indicated concerns regarding cost of services and researched possible cancellation of services, a customized offer of reduced rates may be provided with respect to the subscribed services to avoid risk of possibly losing the user as a customer.

If the user is determined to be within a third group, then the user may be provided access to an automated system for self-servicing at S409.

Figure 5:
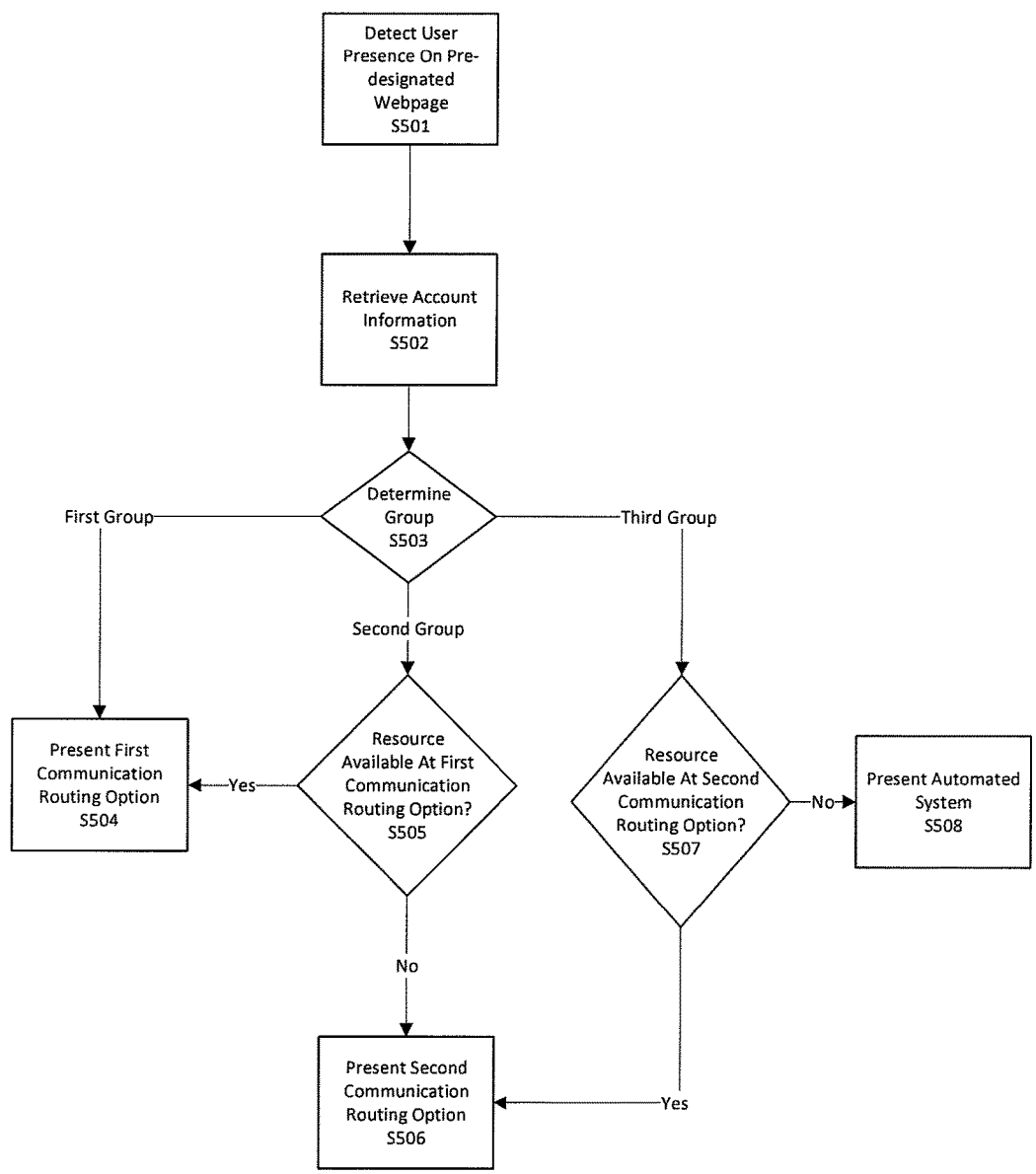
FIG. 5 shows an exemplary method for customized communication routing in view of resource availability, according to an aspect of the present disclosure.

FIG. 5 shows an exemplary method for customized communication routing in view of resource availability, according to an aspect of the present disclosure.

At S501, a user's presence on a pre-designated webpage among multiple webpages of a website is detected. In an example, the user's presence at the pre-designated webpage may be detected in response to a navigation operation from another webpage via a web browser (e.g., user clicking on a link to the pre-designated webpage), or entering a web address corresponding to the pre-designated webpage. Once user's presence at the pre-designated webpage is detected at S501, account information of the user is retrieved at S502.

In an example, the account information of the user may be automatically retrieved based on login information provided by the user, which may be provided by the user upon arriving at the pre-designated webpage or stored from an earlier session. In another example, the account information of the user may be retrieved automatically when the website recognizes that a device (e.g., smart phone) used to enter the website has been registered with the service provider or the website.

At S503, a determination of group assignment for the user is made. If the user is determined to be within a first group, then the user may be presented with a first communication routing option at the pre-designated webpage for providing access to a first communication channel at S504. More specifically, the user may be provided with a contact number, a virtual button, a link, and the like, to provide access to the first communication channel. The first group may, for example, include a group of users that may contribute resources above a first predetermined threshold or a group of users that may expend resources of the service provider below a predetermined alpha threshold. For example, a user that may contribute resources below the first predetermined threshold to the service provider, but incurs negligible or no resource expenditure by the service provider may be designated to be in the first group. The first communication channel may include, domestic call centers, call centers with shorter wait times, call centers with more experienced or highly rated customer service agents, and the like.

If the user is determined to be within a second group, then resource availability for the first communication channel may be determined at S505. The second group may, for example, include a group of users that may contribute resources below the first predetermined threshold but above a second predetermined threshold, or a group of users that may expend resources of the service provider above the alpha threshold but below a predetermined beta threshold. If sufficient resources are determined to be available (e.g., over 50% of idle customer service agents) for the first communication channel, the user belonging to the second group may be presented with a first communication routing option at the pre-designated webpage for providing access to the first communication channel at S504. For example, if the user belonging to the second group seeks customer support at off-peak hours, the service provider may want to route the user belonging to the second group to the first communication channel, which may have idle but more qualified customer service agents, for potentially superior customer service and experience.

If sufficient resources are determined not to be available at S505, then the user may be presented with a second communication routing option at the pre-designated webpage for providing access to a second communication channel at S506. The second communication channel may include off-shore call centers, call centers with longer wait times, call centers with less experienced customer service agents, and the like.

If the user is determined to be within a third group, then resource availability at the second communication channel may be determined at S507. The third group may, for example, include a group of users that may contribute resources below the second predetermined threshold or a group of users that may expend resources of the service provider above the beta threshold. If sufficient resources are determined to be available (e.g., over 50% of idle customer service agents) at the second communication channel, the user belonging to the third group may be presented with a second communication routing option at the pre-designated webpage providing access to the second communication channel at S506. For example, if the user belonging to the third group seeks customer support at off-peak hours, the service provider may want to route the user belonging to the third group to the second communication channel, which may have idle customer service agents, for potentially superior customer service and experience.

If sufficient resources are determined not to be available as S507, then the user may be presented with an automated self-servicing system at S508. The automated self-servicing system may be, for example, web based or telephone based (e.g., interactive voice response system).

Figure 6:
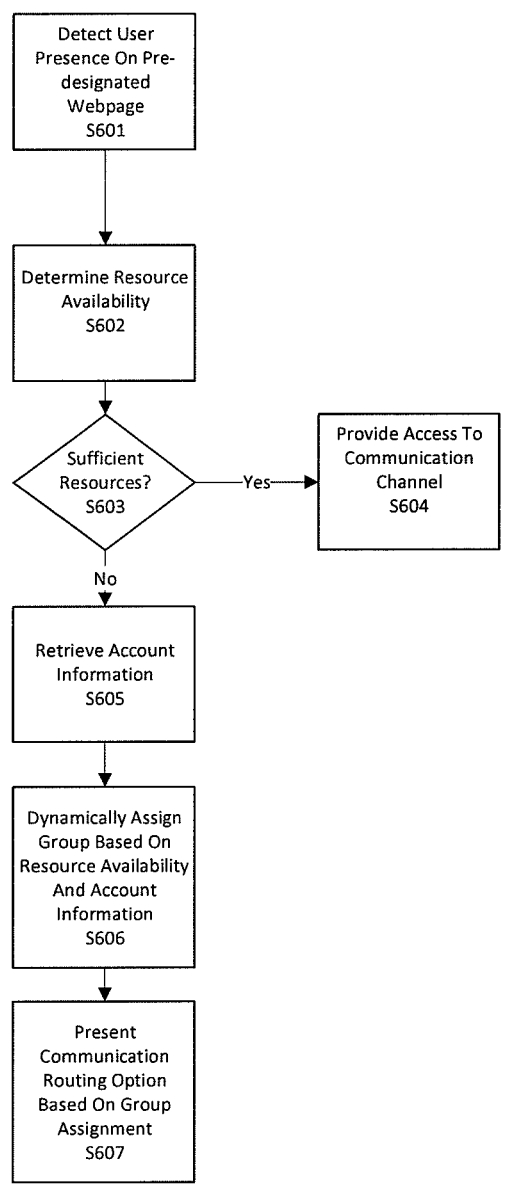
FIG. 6 shows an exemplary method for customized communication routing in view of resource availability, according to an aspect of the present disclosure.

FIG. 6 shows an exemplary method for customized communication routing in view of resource availability, according to an aspect of the present disclosure.

At S601, a user's presence on a pre-designated webpage of a website of the service provider may be detected. The website of the service provider may include a single webpage or multiple webpages that are linked together. In an example, the user's presence may be detected without identifying information, such as a user name.

Once user's presence at the pre-designated webpage is detected at S601, resource availability of various communication channels is determined or calculated at S602. More specifically, resource availability of communication channels having customer service agents of certain level or skill is considered. At S603, if sufficient resource at the communication channels having customer service agents of certain level of skill is determined to be available, an access to the respective communication channels is provided at S604.

For example, if it is determined that resources are sufficiently available at a communication channel with service agents (e.g., large number of idle customer service agents), the user may be allowed to connect to the communication channel without consideration of account information of the user. Further, resource availability may be determined based on issue resolution sought by the user (e.g., adding a service, which may typically have lower wait times) to allow the user to connect to the communication channel without consideration of account information of the user.

If it is determined that sufficient resources are not available at the respective communication channel(s) at S603, account information of the user is retrieved at S605.

In an example, the account information of the user may be retrieved based on login information provided by the user, which may be provided by the user when entering the website or upon arriving at the pre-designated webpage. In another example, the account information of the user may be retrieved automatically when the website recognizes that a device (e.g., smart phone) used to enter the website has been registered with the service provider or the website.

Account information of the user may include various aspects of the user's history with the website. For example, account information may include a user's tenure with the service provider represented by the website, service history (e.g., current service plan, previous service plans), payment history, promotion history (e.g., promotions previously applied), membership history (e.g., prior cancellation requests, complaints, etc.) and/or support history (e.g., previous contacts with support center including dates, reason (s), and resolution).

Using one or more items included in the account information, the user's group assignment for routing may be dynamically determined in view of the resource availability at S606. For example, if the user's dynamic group assignment indicates that the user would normally be routed to the second communication channel, but resource availability indicates for the first communication channel's availability, the user may be dynamically assigned to a first group for servicing by the first communication channel. At S607, the user is presented with a communication routing option at the pre-designated webpage for providing access to a corresponding communication channel. More specifically, the user may be provided with a contact number, a virtual button, a link, and the like, to provide access to the corresponding communication channel.

Although various portions of the present disclosure have been described with respect to a website of a service provider, aspects of the present disclosure are not limited thereto, such that the described methods may be used with other vehicles of communication (e.g., telephone communication or the like).

Further, although various portions of the present disclosure have been described with respect to a customer retention services, aspects of the present disclosure are not limited thereto, such that the described methods, devices, and systems may be used with other services (e.g., technical support, billing support, etc.).

Figure 7:
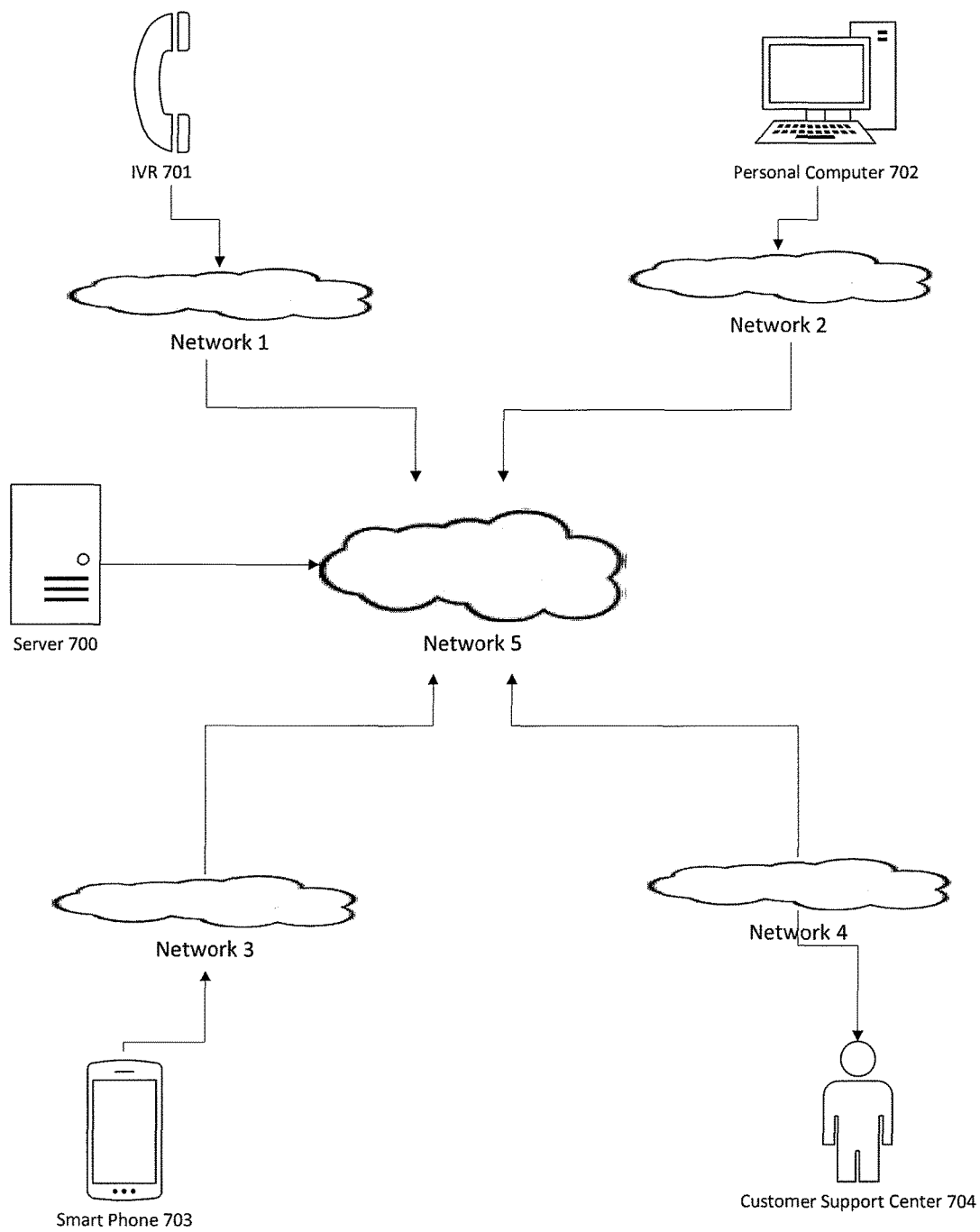
FIG. 7 shows an exemplary system for customized communication routing, according to an aspect of the present disclosure.

FIG. 7 shows an exemplary system for customized communication routing, according to an aspect of the present disclosure.

Referring to FIG. 7, a server 700 may receive or collect navigational and/or account information of various users conducted through their respective devices. Information of the various users may be collected through, for example, an interactive voice recognition (IVR) system 701, a personal computer 702, and a smart phone 703. However, aspects of the disclosure are not limited the described devices, such that the server 700 may also receive or collect information from any computing device having at least a processor and/or a transmitter/receiver, such as wearable smart devices (e.g., fitness tracking devices, smart watches, etc.), smart electronic equipment (e.g., televisions) smart appliances or the like. Further, the server 700 may receive resource availability information from a customer support center server 704.

The various devices may transmit or receive information to or from the server 700 through or via a plurality of networks. The interactive voice recognition system 701 may communicate through a network 1, the personal computer 702 may communicate through a network 2, the smart phone 703 may communicate through a network 3, and the customer support center server 704 may communicate through a network 4. Further, the server 700 may communicate with one or more of the various devices through a network 5.

Network 1, network 2, network 3, network 4, and/or network 5 may include a mobile network, wireless network, wired network, a telecommunications network, or any (other) data network that allows computing devices to exchange data. Although the server 700 is illustrated as communicating with other devices through the network 5, aspects of the present disclosure are not limited to the described network, such that the server 700 may communicate with one or more of the devices through a different network.

Further, the information received through the various devices may go through a conversion process to convert the received information to a singular format for use by the server 700. Similarly, when information is transmitted from the server 700 to the respective devices, the transmitted information may also go through a conversion process for receipt or use by the respective devices.

According to an aspect of the present disclosure, a method for customizing communication routing option includes detecting a presence of a first user on a pre-designated webpage of a plurality of webpages of a website, retrieving account information of the first user in response to the detected presence, and dynamically modifying the pre-designated webpage to present a communication routing option based on the account information of the first user, in which the communication routing option presented to the first user is different from a communication routing option presented to a second user having different account information.

According to an aspect of the present disclosure, the first communication routing option includes a first communication channel different from a second communication channel corresponding to the second communication routing option.

According to an aspect of the present disclosure, the method further includes determining a resource availability for the first communication channel, and providing access to the first communication channel for the second user if sufficient resource is determined to be available for the first communication channel.

According to an aspect of the present disclosure, the method further includes determining a duration of time a user is present on the pre-designated webpage, and initiating communication with the first user if the duration of time on the pre-designated webpage is greater than a predetermined value.

According to an aspect of the present disclosure, the account information of the first user includes a group assignment of the first user.

According to another aspect of the present disclosure, the account information of the first user includes tenure of the first user with a service provider corresponding to the website.

According to yet another aspect of the present disclosure, the account information of the first user includes a record of an amount of resources expended by a service provider in a previous interaction with the first user.

According to yet another aspect of the present disclosure, the account information of the first user includes a record of an amount of previous resources contributed to a service provider by the first user.

According to yet another aspect of the present disclosure, the account information includes a history of modifications to the account information of the first user.

According to yet another aspect of the present disclosure, the communication routing option presented to the first user provides access to a customer service agent of a first tier.

According to yet another aspect of the present disclosure, the communication routing option presented to the second user provides access to a customer service agent of a second tier.

According to yet another aspect of the present disclosure, the communication routing option presented to the first user provides access to an automated system.

According to yet another aspect of the present disclosure, the method further includes monitoring selections made by the first user in the automated system, and presenting a communication routing option for accessing a customer service agent based on the selections made.

According to an aspect of the present disclosure, the method further includes monitoring selections made by the first user in the automated system, calculating a potential resource expenditure based on the selections made, and determining whether to provide access to a customer service agent based on the calculation.

According to an aspect of the present disclosure, the method further includes monitoring selections made by the first user in the automated system, calculating a potential for future resource contribution to a service provider by the first user based on the selections made, and determining whether to provide access to a customer service agent based on the calculation.

According to an aspect of the present disclosure, the method further includes monitoring selections made by the first user in the automated system, and presenting an offer based on the selections made.

According to an aspect of the present disclosure, the first communication routing option is presented after a predetermined period of time has passed while the user is on the pre-designated webpage.

According to an aspect of the present disclosure, the method further includes dynamically determining a group assignment for the first user based on the account information of the first user.

According to an aspect of the present disclosure, a tangible non-transient computer readable storage medium that stores a computer program, the computer program, when executed by a processor, causing a computer apparatus to perform a process including detecting a presence of a first user on a pre-designated webpage of a plurality of webpages of a website, retrieving account information of the first user in response to the detected presence, and dynamically modifying the pre-designated webpage to present a communication routing option based on the account information of the first user, in which the communication routing option presented to the first user is different from a communication routing option available to a second user having different account information.

According to an aspect of the present disclosure, a computer apparatus includes a memory that stores instructions, and a processor that executes the instructions. When executed by the processor, the instructions cause the processor to perform the following operations: detecting a presence of a first user on a pre-designated webpage of a plurality of webpages of a website, retrieving account information of the first user in response to the detected presence, and dynamically modifying the pre-designated webpage to present a communication routing option based on the account information of the first user, in which the communication routing option presented to the first user is different from a communication routing option available to a second user having different account information.

Accordingly, a system and method for customized communication routing enables customized routing of users to provide improved servicing for specific group of clients and resource management. By customizing communication routing to communication channels based on user information, users can expect to receive customized levels of service corresponding to the user information and a service provider may expend its resources more appropriately. Further, by routing a user in view of resource availability, a service provider may better manage use of its resources while offering its users better servicing. In addition, by dynamically grouping a user in view of resource availability, a service provider may better cater to users that may frequently change their account information with currently available resources.

Although a system and method for customized communication routing has been described with reference to several exemplary embodiments, it is understood that the words that have been used are words of description and illustration, rather than words of limitation. Changes may be made within the purview of the appended claims, as presently stated and as amended, without departing from the scope and spirit of the system and method for customized communication routing has been described with reference to particular means, materials and embodiments, the system and method for customized communication routing is not intended to be limited to the particulars disclosed; rather system and method for customized communication routing extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, the communication channels, servers, devices, and websites described herein represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for customizing communication routing option, the method comprising:

detecting, by a processor of a server, a presence of a first user on a pre-designated webpage among a plurality of webpages of a website based on a web navigation operation;

obtaining, by the processor, user information of the first user in response to the detected presence;

dynamically modifying, by the processor and in response to obtaining the user information of the first user, a display of the pre-designated webpage to display an available communication routing option corresponding to the user information of the first user while hiding at least one communication routing option unavailable to the first user; and routing, by the processor, a request for communication by the first user to a communication channel type corresponding to the available communication routing option for the first user, wherein the communication routing option displayed to the first user is different from a communication routing option available to a second user having different user information.

2. The method according to claim 1, wherein the first communication routing option includes a first communication channel type different from a second communication channel type corresponding to the second communication routing option.

3. The method according to claim 2, further comprising:
determining, by the processor, a resource availability for the first communication channel type; and
providing access to the first communication channel type for the second user if sufficient resource is determined to be available for the first communication channel type.

4. The method according to claim 1, further comprising:
determining, by the processor, a duration of time that the first user is present on the pre-designated webpage; and
initiating communication, by the processor, with the first user if the duration of time on the pre-designated webpage is greater than a predetermined value.

5. The method according to claim 1, wherein the first user and the second user are grouped separately based on the user information of the first user and the second user, respectively.

6. The method according to claim 1, wherein the user information of the first user includes a tenure of the first user with a service provider corresponding to the website.

7. The method according to claim 1, wherein the user information of the first user includes a record of an amount of resources expended by a service provider in a previous interaction with the first user.

8. The method according to claim 1, wherein the user information of the first user includes a record of an amount of resources contributed to a service provider by the first user.

9. The method according to claim 1, wherein the user information includes a history of modifications to information of the first user.

10. The method according to claim 1, wherein the communication routing option presented to the first user provides access to a customer service agent of a first tier.

11. The method according to claim 10, wherein the communication routing option presented to the second user provides access to a customer service agent of a second tier.

12. The method according to claim 1, wherein the communication routing option presented to the first user provides access to an automated system.

13. The method according to claim 12, further comprising:
monitoring, by the processor, selections made by the first user in the automated system; and
presenting, by the processor, a communication routing option for accessing a customer service agent based on the selections made.

14. The method according to claim 12, further comprising:
monitoring, by the processor, selections made by the first user in the automated system;
calculating, by the processor, a potential resource expenditure based on the selections made; and
determining, by the processor, whether to provide access to a customer service agent based on the calculation.

15. The method according to claim 12, further comprising:
monitoring, by the processor, selections made by the first user in the automated system;
calculating, by the processor, a potential for future resource contribution to a service provider by the first user based on the selections made; and
determining, by the processor, whether to provide access to a customer service agent based on the calculation.

16. The method according to claim 12, further comprising:
monitoring, by the processor, selections made by the first user in the automated system; and
presenting, by the processor, an offer based on the selections made.

17. The method according to claim 1, wherein the first communication routing option is presented after a predetermined period of time has passed while the first user is on the pre-designated webpage.

18. The method according to claim 1, further comprising:
dynamically determining, by the processor, a group assignment for the first user based on the user information of the first user.

19. A tangible non-transitory computer readable storage medium that stores a computer program, the computer program, when executed by a processor, causing a computer apparatus to perform a process comprising:
detecting a presence of a first user on a pre-designated webpage among a plurality of webpages of a website based on a web navigation operation;
obtaining user information of the first user in response to the detected presence;
dynamically modifying, in response to obtaining the user information of the first user, a display of the pre-designated webpage to display an available communication routing option corresponding to the user information of the first user while hiding at least one communication routing option unavailable to the first user; and
routing, by the processor, a request for communication by the first user to a communication channel type corresponding to the available communication routing option for the first user,
wherein the communication routing option displayed to the first user is different from a communication routing option available to a second user having different user information.

20. A computer apparatus, comprising:
a memory that stores instructions, and
a processor that executes the instructions,
wherein, when executed by the processor, the instructions cause the processor to perform operations comprising:

detecting a presence of a first user on a pre-designated webpage among a plurality of webpages of a website based on a web navigation operation;

obtaining user information of the first user in response to the detected presence;

dynamically modifying, in response to obtaining the user information of the first user, a display of the pre-designated webpage to display an available communication routing option corresponding to the user information of the first user while hiding at least one communication routing option unavailable to the first user; and routing a request for communication by the first user to a communication channel type corresponding to the available communication routing option for the first user, wherein the communication routing option displayed to the first user is different from a communication routing option available to a second user having different user information.

* * * * *